(12) United States Patent
Bangheri

(10) Patent No.: US 10,605,501 B2
(45) Date of Patent: Mar. 31, 2020

(54) ABSORPTION HEAT PUMP AND METHOD FOR OPERATING AN ABSORPTION HEAT PUMP

(71) Applicant: Andreas Bangheri, Brixlegg (AT)

(72) Inventor: Andreas Bangheri, Brixlegg (AT)

(*) Notice: Subject to any disclaimer, the term of this patent is extended or adjusted under 35 U.S.C. 154(b) by 0 days.

(21) Appl. No.: 15/680,379

(22) Filed: Aug. 18, 2017

(65) Prior Publication Data

US 2018/0051919 A1  Feb. 22, 2018

(30) Foreign Application Priority Data

Aug. 18, 2016  (EP) .................... 16184726

(51) Int. Cl.
| F25B 30/04 | (2006.01) |
| --- | --- |
| F25B 47/02 | (2006.01) |
| F25B 15/04 | (2006.01) |
| F25B 17/02 | (2006.01) |

(52) U.S. Cl.
CPC .............. *F25B 30/04* (2013.01); *F25B 15/04* (2013.01); *F25B 47/027* (2013.01); *F25B 17/02* (2013.01); *F25B 2315/002* (2013.01); *F25B 2347/02* (2013.01); *F25B 2500/02* (2013.01); *F25B 2500/31* (2013.01); *F25B 2600/11* (2013.01); *F25B 2600/2507* (2013.01);

(Continued)

(58) Field of Classification Search
CPC ........ F25B 30/04; F25B 15/04; F25B 47/027; F25B 17/02; F25B 2315/002; F25B 2347/02; F25B 2600/2501; F25B 2400/0403; F25B 2500/02; F25B 2500/31; F25B 2600/11; F25B 2600/2507; F25B 2600/2517; Y02B 30/62; Y02A 30/277
USPC ................................ 62/101, 102, 103, 106
See application file for complete search history.

(56) References Cited

U.S. PATENT DOCUMENTS

| 3,527,061 A | * | 9/1970 | Kruggel | ................. F25B 49/043 |
| | | | | 62/142 |
| 4,164,128 A | * | 8/1979 | Newton | .................. F25B 15/06 |
| | | | | 62/105 |

(Continued)

FOREIGN PATENT DOCUMENTS

| CN | 102840719 A | 12/2012 |
| DE | 3016532 A1 | 11/1981 |

(Continued)

*Primary Examiner* — Cassey D Bauer
*Assistant Examiner* — Kirstin U Oswald
(74) *Attorney, Agent, or Firm* — David S. Safran; Roberts Calderon Safran & Cole, P.C.

(57) ABSTRACT

An absorption heat pump having a generator, a heat source to heat the generator to drive coolant vapor out of solution, a condenser for cooling the coolant vapor and an expansion valve that expand the coolant fluid as well as an evaporator for at least partial evaporation of the expanded coolant fluid against a medium which is connected to at least one absorber which absorbs the expanded coolant fluid. A hot gas line which branches off from a line for coolant vapor upstream of the condenser and is fluid-connected to the evaporator such that it bypasses the condenser and the expansion valve, a defrosting valve being provided in the hot gas line, by means of which the flow of coolant vapor through the hot gas line can be controlled. The absorption heat pump is operated in a cyclic circulation process.

13 Claims, 2 Drawing Sheets

(52) U.S. Cl.
CPC ..... *F25B 2600/2517* (2013.01); *Y02A 30/277* (2018.01); *Y02B 30/62* (2013.01)

(56) References Cited

U.S. PATENT DOCUMENTS

| | | | | |
|---|---|---|---|---|
| 4,309,877 A * | 1/1982 | Tawse | ................ | F02G 5/00 62/238.1 |
| 4,327,555 A * | 5/1982 | Dimon | ................ | F24F 5/0046 62/485 |
| 4,341,084 A * | 7/1982 | Rojey | ................ | F25B 15/02 62/101 |
| 4,373,347 A * | 2/1983 | Howell | ................ | B01D 53/263 62/112 |
| 4,383,416 A * | 5/1983 | Phillips | ................ | F25B 15/02 62/101 |
| 4,394,959 A * | 7/1983 | de Vries | ................ | F25B 30/04 165/62 |
| 4,413,479 A * | 11/1983 | Rojey | ................ | F25B 15/02 62/101 |
| 4,561,259 A * | 12/1985 | van der Sluys | ................ | F25B 29/006 62/101 |
| 4,596,122 A * | 6/1986 | Kantner | ................ | F25B 33/00 62/141 |
| 4,622,825 A * | 11/1986 | Larue | ................ | C09K 5/047 62/102 |
| 4,776,176 A * | 10/1988 | Vinz | ................ | F04B 9/1178 62/101 |
| 5,033,274 A * | 7/1991 | Erickson | ................ | F25B 15/02 62/476 |
| 5,282,369 A * | 2/1994 | Ohuchi | ................ | F24F 3/06 62/476 |
| 5,367,884 A * | 11/1994 | Phillips | ................ | F25B 15/02 62/101 |
| 5,570,584 A * | 11/1996 | Phillips | ................ | F25B 15/02 62/101 |
| 5,579,652 A * | 12/1996 | Phillips | ................ | F25B 15/02 62/476 |
| 5,782,097 A * | 7/1998 | Phillips | ................ | F25B 15/02 62/101 |
| 5,896,747 A * | 4/1999 | Antohi | ................ | B60H 1/3201 62/101 |
| 5,941,089 A * | 8/1999 | Takaishi | ................ | F25B 15/02 62/324.2 |
| 6,101,832 A * | 8/2000 | Franz | ................ | F02G 5/02 62/105 |
| 6,332,328 B1 * | 12/2001 | Bangheri | ................ | F25B 49/043 62/141 |
| 8,881,546 B2 * | 11/2014 | Guerra | ................ | F25B 15/02 62/476 |
| 8,950,212 B2 * | 2/2015 | Guerra | ................ | F25B 15/04 62/101 |
| 2010/0175395 A1* | 7/2010 | Erickson | ................ | F01K 25/065 62/101 |
| 2010/0281899 A1 | 11/2010 | Garrabrant | | |
| 2015/0143827 A1* | 5/2015 | Said | ................ | F25B 17/02 62/101 |
| 2015/0345835 A1* | 12/2015 | Martin | ................ | F25B 7/00 62/238.3 |

FOREIGN PATENT DOCUMENTS

| | | | | |
|---|---|---|---|---|
| DE | 3129677 A1 | | 2/1983 | |
| EP | 0107880 A1 * | | 5/1984 | ............ F25B 30/04 |
| GB | 2077407 A * | | 12/1981 | ............ F25B 47/027 |

* cited by examiner

ABSORPTION HEAT PUMP AND METHOD FOR OPERATING AN ABSORPTION HEAT PUMP

BACKGROUND OF THE INVENTION

Field of the Invention

The invention relates to an absorption heat having a generator, a heat source to heat the generator to drive coolant vapor out of solution, a condenser for cooling the coolant vapor and an expansion valve that expand the coolant fluid as well as an evaporator for at least partial evaporation of the expanded coolant fluid against a medium which is connected to at least one absorber which absorbs the expanded coolant fluid, and to a method for operating such an absorption heat pump.

Description of Related Art

Generic absorption heat pumps have an evaporator which is in heat exchange with a fluid circuit which has an outside air heat exchanger. Via this outside air heat exchanger which can additionally have a fan, the heat is withdrawn from the ambient air and is supplied by means of an absorption heat pump to a consumer such as a heating system, for example. But if the ambient air is relatively cold, for example, its temperature is below 0° C., frost or even ice forms on the outside air heat exchanger. The frost or ice acts in this case as a heat insulator so that after such an icing process only greatly reduced energy absorption from the ambient air can occur. This greatly reduces the efficiency of the absorption heat pump and the amount of heat which the absorption heat pump can supply to the user.

SUMMARY OF THE INVENTION

Therefore, the object of this invention is to solve the above indicated problem.

This problem is solved by a heat pump and by a method for operating an absorption heat pump as described herein.

According to the invention, there is a hot gas line which branches off the line for coolant vapor from the condenser and is fluid-connected to the evaporator such that it bypasses the condenser and the expansion valve, a defrosting valve being provided in the hot gas line by means of which the flow of coolant vapor through the hot gas line can be controlled.

This offers the advantage that, via the hot gas line, hot coolant can be supplied to the evaporator since the coolant on this path is not routed through the condenser where it would be cooled. Since the evaporator accepts or can accept such hot coolant, defrosting operation can be initiated in which the evaporator is heated up above its normal operating temperature, and therefore, above the temperature which it reaches when the absorption heat pump is not running in defrosting duty. Since the evaporator is in heat exchange with a fluid circuit of the second medium which has the outside air heat exchanger, the outside air heat exchanger is also heated above its normal operating temperature and defrosting of the outside air heat exchanger takes place so that the insulating ice layer which hinders the heat absorption of the outside air heat exchanger is thawed.

In a method in accordance with the invention for operating an absorption heat pump in a cyclic circulation process, in addition to normal operation, there is a defrosting duty type in which (in contrast to normal operation) coolant vapor which has been withdrawn from the generator is branched off at least partially upstream of the condenser and is supplied to the evaporator bypassing the condenser and the expansion valve in order to heat the evaporator. Here, by the branching-off of the comparatively hot coolant vapor which is being withdrawn from the generator, under the evaporator bypassing the condenser and expansion valve (which would cool the coolant vapor) it is also ensured that the evaporator is heated and defrosted.

In a first especially preferred configuration of this invention, to release heat to the consumer, there is a consumer circuit with a fluid which flows through it. The consumer circuit has an inlet connection and a return connection for connecting a heat release site, for example, a heating system for a building, the consumer circuit coming from the return connection being routed through a second heat exchanger of the generator in order to directly absorb heat from it. Then, the consumer circuit branches off into a condenser branch which is routed through the condenser and an absorber branch which is routed through the absorber. In the condenser branch, there is a hydraulic shutoff valve to control the flow of the medium through the condenser branch. The condenser branch and the absorber branch are combined again upstream of the inlet connection. This offers the advantage that the consumer circuit can absorb the absorption heat from the absorber by the absorber branch, which heat forms by coolant in the absorber being combined with a coolant-poor solution. Coolant and coolant-poor solution are produced in the conventional manner by a solvent-rich solution being heated in the generator and the coolant being driven out of the coolant-rich solution in this way. The division of the consumer circuit in the condenser branch and the absorber branch also offers the advantage that, via the condenser branch, condensation heat can be absorbed from the coolant which is condensing in the condenser and can likewise be supplied to the consumer circuit and thus via the inlet connection to the consumer (in addition to the already described absorption heat) which is being removed from the absorber via the absorber branch.

In another preferred configuration of the invention, the fluid circuit, by means of which the evaporator is in heat exchange with a second medium and which has outside air heat, is made as a brine circuit and there is a brine pump to circulate brine in the brine circuit. This offers the advantage that by means of brine, an aqueous solution of antifreezes (for example, glycols), ambient heat can be supplied especially efficiently to the evaporator.

In another preferred configuration of this invention, the outside air heat exchanger has a fan by means of which the fluid circuit can be exposed to an outside air flow; this improves the heat absorption of the outside air heat exchanger.

In one especially preferred configuration of this invention, the absorption heat pump is operated according to a GAX method.

In this case the absorber is made as a combination of a pre-absorber and a consumer absorber which is located downstream of the pre-absorber. The absorber supply line for coolant and the absorber supply line for the coolant-poor solution discharge into the pre-absorber. A line for a coolant-rich solution in which there is a solution pump connects the consumer absorber to the generator. The consumer absorber is in heat exchange with the consumer via a heat exchanger and the pre-absorber is in heat exchange with the line for the coolant-rich solution.

Preferably, the generator, the condenser, the expansion valve, the evaporator and the absorber establish a coolant circuit through which the coolant flows from the generator to the absorber and the coolant-rich solution flows from the absorber as far as the generator, thus, enabling a cyclic circulation process.

In one especially preferred configuration of this invention, the heat source, which is made to heat the generator in order to drive the coolant vapor out of the solution, is a heat exchanger (not to be confused with the outside air heat exchanger which heats the evaporator via the brine circuit). This offers the advantage that fuel need not be burned or electric power need not be made available in order to provide the amount of heat which is needed to drive the coolant vapor out of the solution. Therefore, ambient heat can likewise be used at no cost, or exhaust heat of production operation, and if need be, energy is additionally required to operate the heat exchanger (for example, for pumps or regulation apparatus). Solar energy can also be used for this purpose.

A gas burner or an oil burner can also be used as a heat source to heat the generator. Furthermore, there can also be a hybrid duty type in which, for example, a burner and a solar system (solar collectors) heat the generator, and depending on the absorbed solar energy, the heater contributes to heating more or less.

In a method in accordance with the invention for operating an absorption heat pump in a cyclic circulation process:

in normal operation;

a heat source heats a generator in order to drive a coolant vapor out of a solution which is contained in a generator, in an upper region of the generator coolant vapor is removed from the generator, the removed coolant vapor is supplied to a condenser which cools the coolant vapor as heat is released to a consumer and in doing so condenses the coolant vapor at least in part or completely in order to obtain a coolant fluid, the coolant fluid is supplied to the expansion valve which expands the coolant fluid, the expanded coolant fluid is supplied to an evaporator for at least partial evaporation of the expanded coolant fluid as heat is absorbed from a medium, the coolant fluid is supplied to an absorber where it is absorbed from the coolant-poor solution which is withdrawn from a lower region of the generator in order to produce a coolant-rich solution which is supplied to the generator, the absorber being in heat exchange with the consumer so that the generated heat of solution is supplied to the consumer, and in defrosting operation:

the coolant vapor which has been taken from the generator is branched off a least partially upstream of the condenser and is supplied to the evaporator bypassing the condenser, the intermediate heat exchanger and the expansion valve in order to heat the evaporator.

In one preferred configuration of the method in accordance with the invention, in the course of the method, a rotational velocity of a fan of the outside air heat exchanger is reduced compared to normal operation of the heat pump or the fan is stopped entirely. While in normal operation, the fan improves the heat absorption of the outside air heat exchanger, in defrosting operation this offers the advantage that the outside air heat exchanger which is at this point being heated essentially via the evaporator can be defrosted better, since the supply of comparatively cold outside air is reduced or completely interrupted.

In another preferred configuration of this method, in defrosting operation, a speed of a circulation pump, in particular a brine pump which circulates a brine circuit which is located for heat transfer between the outside air heat exchanger and the evaporator, depending on the thermal output which is being supplied to the generator by the heat sources, is changed compared to normal operation, i.e. lowered or raised. By lowering, less heat is being dissipated from the outside air heat exchanger and thus defrosting is supported in particular at a rather low heat supply into the generator. Conversely, at a high supply into the generator by an increased circulation speed of the brine, the defrosting is supported.

Preferably, in defrosting operation, a position of the expansion valve which controls the flow rate of the coolant which is to expand is also changed such that the flow rate, compared to normal operation, is reduced or the expansion valve is completely closed. This leads to less coolant being expanded and thus more hot coolant being available for the defrosting process with direct supply of hot coolant to the absorber.

In one preferred configuration of the method in accordance with the invention, in defrosting operation, a position of a solvent choke which controls the flow rate of coolant-poor solution which is being withdrawn from the generator and supplied to the absorber is changed such that the flow rate is reduced compared to normal operation. In doing so, compared to normal operation, the solvent choke can be reduced by 10-40%, preferably roughly 20%. Since then no cold is being produced, smaller solution circulation is required.

More advantageously the output of a heat source for driving out a coolant vapor of a solution which is located in the generator, continues to be increased compared to normal operation. This offers the advantage that the amount of hot coolant which can be taken from the generator can be increased to support defrosting.

If the output of the heat source is at or near a value which is maximum for normal operation before initiation of defrosting, it can also be necessary that it be reduced in defrosting operation in order to be able to keep the circulation process stable.

Preferably, the defrosting, proceeding from normal operation, is started when the air inlet temperature of the outside air heat exchanger is below an adjustable boundary value from 3 to 10° C., preferably below roughly 7° C., and at least one of the following conditions are satisfied:

a brine inlet temperature with which the brine enters the outside air heat exchanger, or the brine outlet temperature with which brine emerges from the outside air heat exchanger, is by more than an adjustable boundary value below the air inlet temperature with which air enters the outside air heat exchanger; this can indicate reduced heat release by icing, or the difference between the brine inlet temperature and the brine outlet temperature falls below a given minimum value, an air outlet temperature of the outside air heat exchanger is below the air inlet temperature by less than an adjustable boundary value; this can likewise indicate a reduced heat release due to icing, the respective boundary value being adjustable in a range from 5 to 12K and preferably being roughly 8K.

The invention is explained in detail below by way of example below with reference to the accompanying figures.

DETAILED DESCRIPTION OF THE INVENTION

Figure 1:
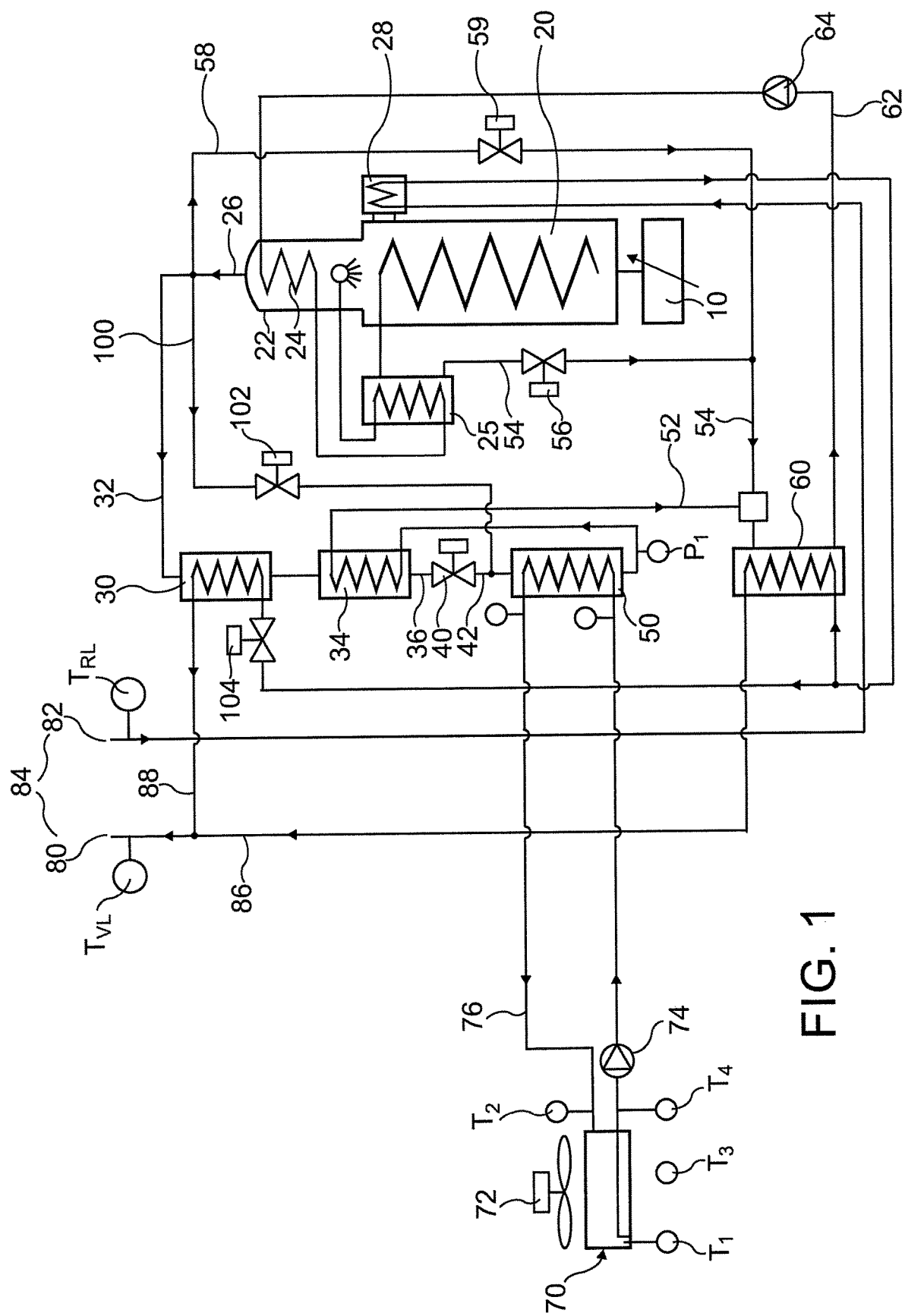
FIG. 1 shows an absorption heat pump in accordance with the invention with an absorber.
Figure 2:
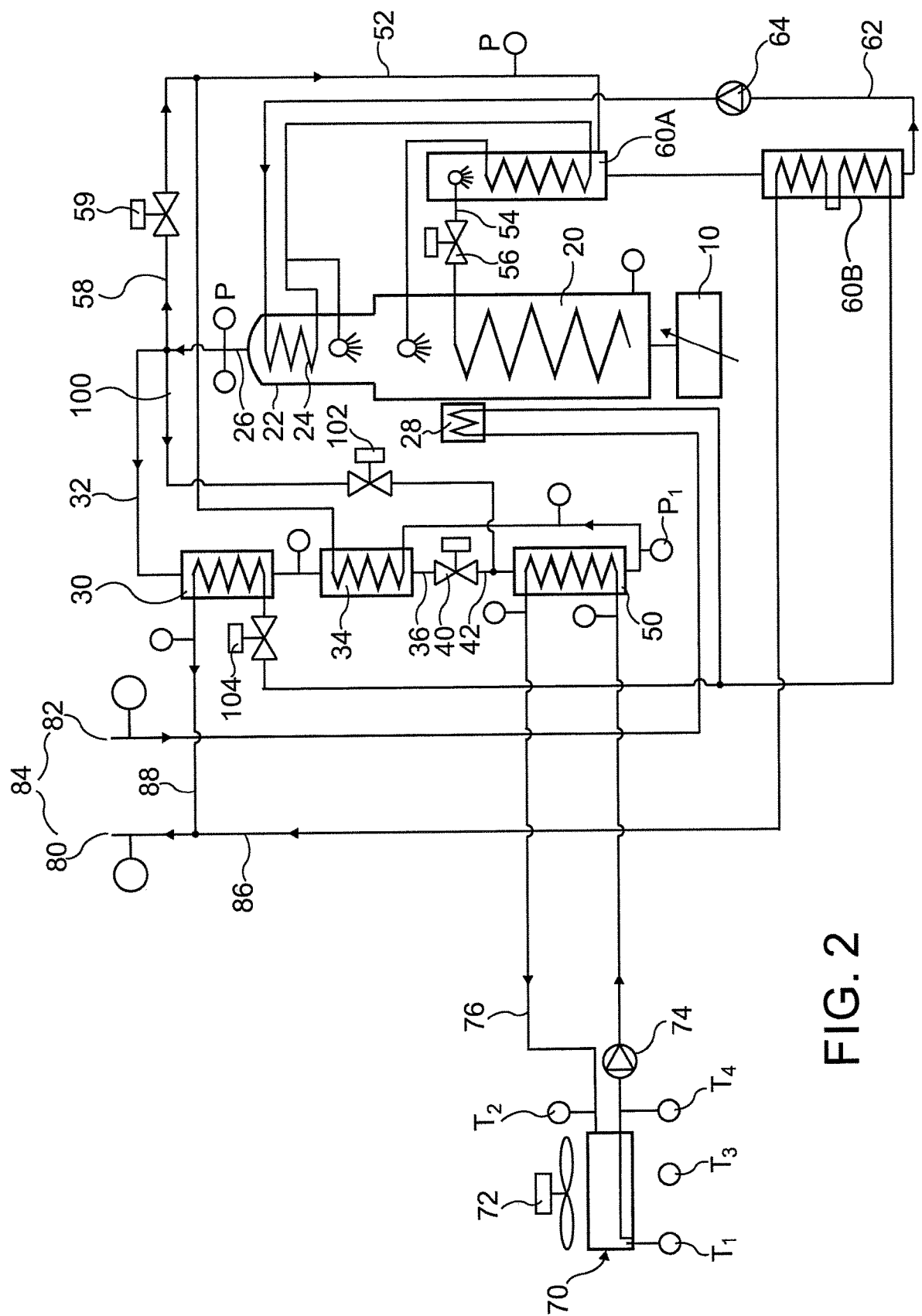
FIG. 2 shows a version of an absorption heat pump with a multistage GAX process with two absorbers.

FIG. 1 shows an absorption heat pump in accordance with the invention which has a single absorber 60. FIG. 2 shows an absorption heat pump for a multistage process with two absorbers, specifically a pre-absorber 60A and a consumer absorber 60B which with a GAX process (GAX=generator/absorber heat exchange cycle). The same reference numbers are used for the same components of FIGS. 1 and 2.

FIG. 1 shows an absorption heat pump which has a gas burner 10, a generator 20, a condenser 30, an expansion valve 40, an evaporator 50 and an absorber 60 which enable a cyclic circulation process. The generator 20 contains a solution which has a coolant. The coolant can be for example, ammonia which is dissolved in water.

The generator 20 is connected to a heat source which is made in this case as a gas burner 10, and can supply heat to the generator 20. Alternatively, there can be a heat exchanger which can absorb ambient heat or exhaust heat and can release it to the generator 20. This heat exchanger can furthermore also be heated by means of solar energy by solar collectors. By supplying heat to the generator 20, coolant is driven out of the solution as coolant vapor.

The coolant vapor is brought to a high temperature level/high pressure level by this process. Out of an outlet 26 for coolant vapor in an upper region of the generator, hot coolant vapor which is at the high pressure level is supplied via a line 32 for coolant vapor to a condenser 30 and is condensed there. The condenser 30 is made as a heat exchanger here and supplies to a condenser branch 88 of a consumer circuit 84 condensation heat which is supplied to an inlet connection 80 by means of the consumer circuit 84. A thermal user which is not described in detail, for example, a heating system for a building, is connected to the inlet connection 80.

After passing through the condenser 30 and an intermediate heat exchanger 34, the at least partially or completely condensed coolant vapor is routed via a line 36 for coolant fluid through an expansion valve 40 and expanded. After passing through the expansion valve 40, the coolant fluid is already dramatically cooled and expanded to a low pressure level. In the evaporator 50, the coolant fluid is, at this point, evaporated and supplied to the absorber 60.

Via an absorber supply line 54, a coolant-poor solution which has been taken from a lower region of the generator 20 beforehand is likewise supplied to the absorber 60. In the absorber 60, the solution which has been depleted of coolant is combined with the coolant which has passed through the evaporator 50 and has been supplied to the absorber 60 via the absorber supply line 52 for coolant. The heat of solution which is formed by the dissolution of the coolant in the coolant-poor solution is made available to the expeller process and to the consumer (GAX) or is dissipated only to the consumer (non-GAX). The solution which is rich in coolant and which forms here is supplied again to the generator 20 by means of a solution pump 64.

To evaporate the coolant in the evaporator 50 heat is removed from the ambient air. To do this, the evaporator 50 is in heat exchange with an outside air heat exchanger 70 which can have a fan 72. The heat exchange between the outside air heat exchanger 70 and the evaporator 50 takes place via a brine circuit 76 in which a brine is circulated by means of a brine pump 74.

Downstream of the evaporator 50 and upstream of the intermediate heat exchanger 34, there is a pressure sensor P1 which can determine the pressure of the coolant in this low pressure region (region between the expansion valve 42 and generator 20). From this pressure, a temperature of the coolant in the low pressure region directly downstream of the absorber 60 can be determined.

The heat release of the absorption heat pump to the consumer takes place in the embodiment of FIG. 1 (non-GAX), as already explained, via the condenser branch 88, by means of which condensation heat from the condenser 30 is supplied to the consumer circuit 84. Another heat source can be the absorber 60 by means of which solution heat of absorption of the coolant by the heat of solution of the absorption of the coolant is supplied by the solvent to an absorber branch 86, likewise to the consumer circuit 84, and thus likewise to the consumer. To do this, the consumer circuit 84 branches off from a return connection 82 coming from the consumer into the absorber branch 86 and the condenser branch 88, the two branches being combined again upstream of the inlet connection 80 into a single segment of the consumer circuit 84.

Prior to the branching-off of the consumer circuit 84 into the absorber branch 86 and the condenser branch 88, the consumer circuit 84 is routed through a second heat exchanger 28 which is located in an upper region of the generator 20, therefore a comparatively warm region in order to preheat the cold heating agent which is returning from the consumer through the return connection 82.

As already explained, a coolant-rich solution is taken from the absorber 60 and is supplied again via the line 62 for the coolant-rich solution and the solvent pump 64 to the generator 20. To do this, the coolant-rich solution first passes via a heat exchanger 24 through a rectifier 22 of the generator 20. Before the coolant-rich solution is finally injected into an upper region of the generator 20, it passes through another heat exchanger 25 in which there is heat exchange with the coolant-poor solution which has been withdrawn from the lower region of the generator (which is supplied to the absorber 60 via the absorber supply line 54) in order to preheat the coolant-rich solution (non-GAX circuit of FIG. 1).

In the absorption heat pump there is furthermore an intermediate heat exchanger 34 through which the vaporized coolant which has been taken from the evaporator flows before it is supplied to the absorber 60 by the absorber supply line 52 for coolant. In the intermediate heat exchanger 34, heat exchange takes place with condensed coolant which is being removed from the condenser 30 upstream of the intermediate heat exchanger 34 and is supplied to the expansion valve 40 downstream of the intermediate heat exchanger 34. In the intermediate heat exchanger 34, therefore, heat from the condensed coolant or coolant fluid is transferred to the evaporated coolant.

In essential points, the process according to FIG. 2 proceeds and the absorption heat pump of FIG. 2 is constructed in the same manner as in the non-GAX circuit of FIG. 1. The major difference in the GAX process of FIG. 2 is the division of the absorber 60 of FIGS. 1 and 2, specifically into the pre-absorber 60A and the consumer absorber 60B in the GAX process of FIG. 2. While in the single-stage non-GAX process according to FIG. 1, the heat of solution which is released in the absorber 60 is supplied essentially only to the consumer via the absorber branch 86 and the consumer circuit 84, in the two-stage GAX process according to FIG. 2, the heat of solution which is being generated in the consumer absorber 60B is likewise supplied to the consumer, heat of solution which is being generated in the pre-absorber 60A however mainly to the generator 20. To do this, the pre-absorber 60A and consumer absorber 60B are connected in series. The absorber supply line 52 for coolant discharges into the pre-absorber 60A in which via the absorber supply line 54 for coolant-poor solution, a coolant-poor solution is injected. In the same manner as in the embodiment of FIG. 1, in the GAX device of FIG. 2 there is a solvent choke 56 in the absorber supply line 54 for coolant-poor solution in order to regulate the flow of coolant-poor solution in the pre-absorber 60A. In the embodiment of FIG. 2 though in the pre-absorber 60A the coolant does not dissolve completely in the solvent, but a mixture of coolant and solution is relayed to the consumer absorber 60B and only there does the essentially complete dissolution (or the absorption) of the coolant in the solution take place. As in the embodiment of FIG. 1, the absorber branch 86 is routed through the absorber, here through the consumer absorber 60B. One part or at least one part of the solvent-rich solution which forms in the pre-absorber 60A is injected directly into the generator 20 so that heat of solution is supplied to the generator 20 since this part of the solvent-rich solution is not in heat exchange with the consumer circuit 84.

Thus, as in the embodiment of FIG. 1 and also of FIG. 2, in normal operation of the respective heat pump the outside air heat exchanger 70 can ice when the outside air temperature T3 is relatively cold, for example, is less than 0° C. In this case frost or ice forms in the region of the outside air heat exchanger; this releases latent energy first by the state change from the liquid to the solid state of the precipitated atmospheric humidity. When the icing process is completed, greatly reduced energy absorption takes place since the ice acts as an insulator.

In order to counteract this, the absorption heat pumps according to this invention enable a defrosting process by means of which a layer of ice can be removed from the outside air heat exchanger. To do this, in the two embodiments according to FIG. 1 and FIG. 2, there is a hot gas line 100 which branches off from the upper region of the generator from the line 32 for coolant vapor, and in this way, supplies hot coolant, bypassing the condenser 30, the intermediate heat exchanger 34 and the expansion valve 40, directly to the evaporator and heats it. A defrosting valve 102 is provided to be able to control the flow of hot coolant through the hot gas line 100.

As soon as icing of the outside air heat exchanger 70 is about to occur or has already started, therefore the defrosting valve 102 can be at least partially opened again, and hot coolant flows directly into the evaporator 50. To support the defrosting process, a hydraulic shutoff valve 104 can furthermore be a least partially or completely closed; it is located in the consumer circuit 84 and here advantageously in the condenser branch 88, and thus, regulates down or interrupts the flow of heating agent through the condenser 30. In this way less heat or none at all is removed from the coolant in the region of the condenser 30; this likewise leads to heating of the evaporator and indirectly also of the outside air heat exchanger 70, which heating is dramatic compared to normal operation. Preferably in the defrosting process the rotational velocity of the fan 72 is lowered or it is completely stopped in order to reduce the incident flow of cold outside air onto the outside air heat exchanger 70 which is to be defrosted. Furthermore, the speed of the brine pump 74 can be reduced so that the brine is more dramatically heated up.

The process proceeds as follows:
1. The heat pump is in closed-loop control.
2. If the air inlet temperature T3<7° C. (adjustment range +10° C. to +3° C.) and
3. The brine inlet temperature T2 or air outlet temperature T1 has a temperature difference from the air inlet temperature T3 greater than 8 K (adjustment range 5 to 12 K)
   Initiation of Defrosting
4. The hydraulic shutoff valve 104 is at least partially closed
5. The rotational velocity of the fan 72 is reduced or the fan is stopped
6. The speed of the brine pump 74 is reduced preferably such that a brine outlet temperature T5 from the outside air heat exchanger reaches at least a minimum value of 3° C. or that a temperature difference between entering brine and exiting brine of at least 5 K is established
7. The defrosting valve 102 opens and hot gas flows into the evaporator, the opening angle of the defrosting valve 102 corresponds essentially to that of the expansion valve 40
8. The expansion valve 40 closes
9. The solvent choke 56 closes by 20% of the previous value
10. The burner output is increased, preferably to roughly 10 kW
11. The temperature in the low pressure region downstream of the evaporator is kept at T2 or T4+2 K by means of the solvent choke 56
12. The end of defrosting when the brine outlet temperature T5 has reached an adjustable value, preferably +6° C. (adjustable +1° C. to +10° C.)
13. The heat pump burner Off.
14. The hydraulic shutoff valve 104 opens
15. The defrosting valve 102 closes.
16. The solvent choke 56 and expansion valve 40 are switched into the normal mode
17. Shutoff of the heat supply by the heat source into the generator 20 for a fixed interval (roughly 3 minutes)
18. If the temperature in the low pressure region downstream of the evaporator 10 K is below T2 or below T4 and less than or equal to 0° C.:
   Start of the burner and heating operation.

What is claimed is:
1. An absorption heat pump, comprising:
   a generator accommodating a coolant solution,
   a heat source positioned to heat the generator to drive coolant vapor out of the coolant solution,
   an outlet located on an upper region of the generator to remove coolant vapor from the generator,
   a condenser,
   an evaporator,
   a line for coolant vapor which links the outlet of the generator in a fluid connection to the condenser for thermal coupling of condensation heat to a consumer via a consumer branch and a separate condenser outlet for at least partially condensed coolant vapor to obtain a coolant fluid,
   an expansion valve for expanding the coolant fluid having an inlet side and an outlet side, the expansion valve being connected on the inlet side to the condenser outlet via a line for the coolant fluid and on an output side via a line to the evaporator for at least partial evaporation of the expanded coolant fluid relative to a heat transfer medium, the heat transfer medium being connected on the output side via an absorber supply line for coolant to at least one absorber for absorbing the expanded coolant fluid by a coolant-poor solution, the absorber being connected with the absorber supply line for the coolant-poor solution by means of which the coolant-poor solution can be withdrawn from a lower region of the generator to produce a coolant-rich solution which is supplied to the generator, the absorber being in heat exchange relation with the consumer to thermally couple generated heat of solution to the consumer, wherein the evaporator is in heat exchange relationship with a fluid circuit of a second medium of an outside air heat exchanger;

wherein a hot gas line branches off from the line for coolant vapor at a location upstream of the condenser and is fluid-connected to the evaporator in bypassing relation to the condenser and the expansion valve, wherein a defrosting valve is provided in the hot gas line by means of which flow of coolant vapor through the hot gas line can be controlled; and wherein to release heat to the consumer, there is a consumer circuit through which a fluid which flows, the consumer circuit having an inlet connection and a return connection coupled to the consumer, the fluid of the consumer circuit being routed through a second heat exchanger of the generator to absorb heat from the generator, then branching off into a condenser branch which is routed through the condenser and an absorber branch which is routed through the absorber, wherein a hydraulic shutoff valve being provided in the condenser branch to control the flow of the medium through the condenser branch, and wherein the condenser branch and the absorber branch are rejoined upstream of the inlet connection.

2. The absorption heat pump in accordance with claim 1, wherein the heat source is a heat exchanger.

3. The absorption heat pump in accordance with claim 2, wherein the fluid circuit is a brine circuit, and wherein a brine pump is provided to circulate brine in the brine circuit.

4. The absorption heat pump in accordance with claim 2, wherein the outside air heat exchanger has a fan for exposing the fluid circuit to an outside air flow.

5. The absorption heat pump in accordance with claim 1, wherein the generator, the condenser, the expansion valve, the evaporator and the absorber are in a coolant circuit through which the coolant flows from the generator to the absorber and the coolant-rich solution flows from the absorber as far as the generator.

6. A method for defrosting an outside air heat exchanger of an absorption heat pump, the absorption heat pump having a generator, a condenser, an expansion valve, an evaporator, an absorber, and a consumer circuit for releasing heat to a consumer, the method comprising using a hydraulic shutoff valve for reducing or interrupting flow through at least one segment of the consumer circuit, the consumer circuit being in heat exchange with the condenser of the absorption heat pump, and reducing a flow of a fluid stream of coolant vapor through a hot gas line by at least partially opening a defrosting valve, the defrosting valve being located in the hot gas line, the coolant vapor of the fluid stream being driven out of solution in the generator by means of a heat source and being supplied by means of the hot gas line to the evaporator bypassing the condenser and the expansion valve.

7. The method in accordance with claim 6, wherein a rotational velocity of a fan of an outside air heat exchanger is reduced compared to normal operation of the heat pump.

8. The method in accordance claim 6, the speed of a circulation pump which circulates a brine circuit for heat transfer between the outside air heat exchanger and the evaporator, is lowered or raised compared to the speed of the circulation pump normal operation.

9. The method in accordance claim 6, wherein a position of the expansion valve which controls the flow rate of the coolant which is to be expanded is changed such that the flow rate is reduced as compared to normal operation.

10. The method in accordance with claim 6, wherein a solvent choke which controls the flow rate of coolant-poor solution which is being withdrawn from the generator and supplied to the absorber is changed such that the flow rate is reduced as compared to normal operation.

11. The method in accordance with claim 10, wherein an opening of the solvent choke is reduced by 10-40% as compared to normal operation.

12. The method in accordance claim 6, wherein the output of the heat source located in the generator for driving coolant vapor out a solution which is being raised or lowered compared to normal operation.

13. The method in accordance claim 6, proceeding from normal operation, defrosting being started when:
an air inlet temperature of the outside air heat exchanger is below an adjustable boundary value by 3 to 10° C., and at least one of the following conditions is satisfied:
a brine inlet temperature is below an air inlet temperature by more than an adjustable boundary value,
a difference between the brine inlet temperature and a brine outlet temperature falls below a given minimum value,
an air outlet temperature of the outside air heat exchanger is below the air inlet temperature by less than an adjustable boundary value
wherein the boundary value is adjustable in a range from 5 to 12K.

* * * * *